(12) United States Patent
Gandham et al.

(10) Patent No.: US 8,520,631 B2
(45) Date of Patent: Aug. 27, 2013

(54) PROXY BASED APPROACH FOR IP ADDRESS ASSIGNMENT TO DECREASE LATENCY OF HAND-OFFS IN MOBILE IP TELEPHONY

(75) Inventors: Shashidhar R. Gandham, Sunrise, FL (US); Amit Shukla, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 603 days.

(21) Appl. No.: 12/583,627

(22) Filed: Aug. 24, 2009

(65) Prior Publication Data

US 2010/0074226 A1 Mar. 25, 2010

Related U.S. Application Data

(60) Provisional application No. 61/192,799, filed on Sep. 22, 2008.

(51) Int. Cl.
*H04W 80/04* (2009.01)

(52) U.S. Cl.
USPC ........... 370/331; 370/252; 370/329; 370/341; 370/431; 370/437; 455/425; 455/430; 455/427; 455/428; 455/429

(58) Field of Classification Search
USPC ................ 370/331, 332, 333, 334; 455/436, 455/439, 442, 33.2
See application file for complete search history.

(56) References Cited

U.S. PATENT DOCUMENTS

| | | | | |
|---|---|---|---|---|
| 7,016,347 | B2 * | 3/2006 | De Oliveira ................... | 370/389 |
| 2001/0044305 | A1 * | 11/2001 | Reddy et al. .................. | 455/436 |
| 2002/0058523 | A1 | 5/2002 | Maggenti et al. | |
| 2003/0054824 | A1 * | 3/2003 | Choi et al. ..................... | 455/436 |
| 2006/0002397 | A1 * | 1/2006 | Xue et al. ................... | 370/395.2 |

* cited by examiner

*Primary Examiner* — Brandon Renner
*Assistant Examiner* — Abdelnabi Musa
(74) *Attorney, Agent, or Firm* — Dennis L. Cook, Esq.

(57) ABSTRACT

A mechanism for decreasing the latency in an IP address assignment process for mobile systems using IP as network layer protocol is described. The proposed system is aimed at supporting seamless hand-offs for real-time applications like VOIP. A set of optimized messages is defined to eliminate the need for exchanging long DHCP messages to acquire an IP address. The mechanism involves splitting the IP address assignment functionality into two parts, with the base station being responsible for assigning IP addresses to individual end user devices, and the Mobile Switching Center assigning a block of IP addresses to each base station.

1 Claim, 3 Drawing Sheets

Message flow for IP address assignment

Message flow for IP address assignment

Association between MSC and Base Stations

IP address assignment procedure during a Handoff

PROXY BASED APPROACH FOR IP ADDRESS ASSIGNMENT TO DECREASE LATENCY OF HAND-OFFS IN MOBILE IP TELEPHONY

CROSS-REFERENCE TO RELATED APPLICATION

The present application claims the benefit of previously filed Provisional Patent Application Ser. No. 61/192,799.

FIELD OF THE INVENTION

This invention addresses the need to transport high bit-rate data and voice to multiple users over wired and wireless means. Specifically, this disclosure describes a mechanism for decreasing the latency in the IP address assignment process for mobile systems using IP as a network layer protocol. The proposed system is aimed at supporting seamless hand-offs for real-time applications like VoIP. A set of optimized messages is defined to eliminate the need for exchanging long Dynamic Host Configuration Protocol (DHCP) messages to acquire an IP address. The mechanism involves splitting the IP address assignment functionality into two parts, with the base station being responsible for assigning IP addresses to individual end user devices, and the Mobile Switching Center assigning a block of IP addresses to each base station.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this proxy based approach for IP address assignment to decrease latency of hand-offs in mobile IP telephony is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VoIP traffic in xMAX wireless networks has been discussed in previously filed patent applications U.S. Ser. Nos. 12/069,057; 12/070,815; 12/380,698; 12/384,546; 12/386,648; 12,387,811; 12/387,807, 12/456,758, 12/456,725, and, 12/460,497 which are incorporated by reference into this disclosure. In the heterogeneous MAC protocol described in these applications, guaranteed timeslots are assigned to forward VoIP packets, temporary timeslots are assigned to forward data packets and contention based access is used to exchange control messages. Note that this heterogeneous MAC protocol is used here as a reference protocol and similarly xMAX as a reference wireless network. The idea of a proxy based approach for IP address assignment to decrease latency of hand-offs in mobile IP telephony as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

A mechanism for decreasing the latency in an IP address assignment process for mobile systems using IP as the network layer protocol is described. The proposed system is aimed at supporting seamless hand-offs for real-time applications like VoIP. A set of optimized messages is defined to eliminate the need for exchanging long DHCP messages to acquire an IP address. The mechanism involves splitting the IP address assignment functionality into two parts, with the base station being responsible for assigning IP addresses to individual end user devices, and the Mobile Switching Center assigning a block of IP addresses to each base station.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

In an xMAX system, one base station services multiple handsets. Similarly, one Mobile Switching Center (MSC) provides service to multiple base stations. In a typical deployment scenario, multiple base stations (BTS) will be needed to cover a citywide area. As a user moves around, the handset will have to seamlessly hand-off from one BTS to another. One of the key requirements of xMAX is that there should be no disruption in voice traffic during handoffs, and also to ensure that minimal voice packets are dropped.

Each MSC forms an IP subnet. If a handset moves from one base station to another within the service area of the same MSC, it does not need to change its IP address. However, when a handset moves from one MSC to another, it must obtain a new IP Address. The latency involved in obtaining an IP address should be negligible so that the user does not notice any appreciable drop in voice quality.

This is not the case with standard DHCP. A normal DHCP exchange involves four messages; DHCPDiscover (342 bytes), DHCPOffer (342 bytes), DHCPRequest (342 bytes), and DHCPAcknowledge (342 bytes). A typical link layer Maximum Transmit Unit (MTU) in xMAX is 64 bytes, thus a minimum of 24 fragments will be transmitted over the air. At most one fragment is transmitted in a super-frame (30 ms), thus the total latency of transmitting 24 fragments is 720 ms.

This contributes to additional delay that will not be acceptable, especially during a handoff scenario. Also, at the boundary of the cell (which is typically the region where handoffs take place), signal strength is weak and link quality will be degraded. This may lead to multiple retransmissions thereby causing further delay. A new mechanism for assigning an IP addresses is proposed, which allows for a much faster IP assignment.

Figure 1:
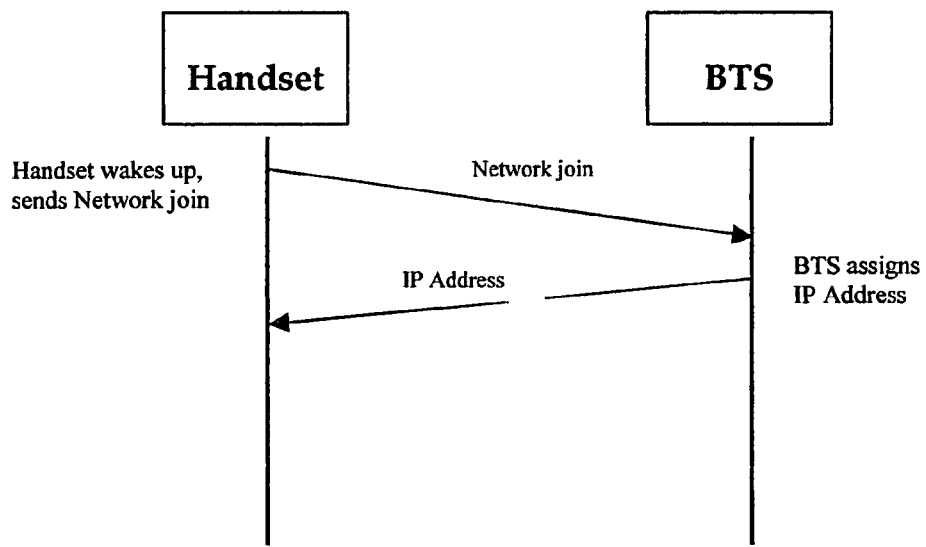
FIG. 1 is a diagram showing message flow for IP address assignment.

In the preferred embodiment the base station maintains a pool of IP addresses, and each handset that joins the network is assigned an IP address from this pool as shown in FIG. 1. The base station periodically obtains or updates the pool of addresses from the MSC. This way, each BTS has a unique set of IP addresses. When a handset powers up, it sends a Network Join message. On receiving this message, the BTS, in addition to registering the handset, sends a reply that includes the IP address assigned to it.

The base station maintains a counter (called the lease counter) that is associated with each IP address. Once the IP address is assigned, the counter is set to a predefined value. The handset periodically sends a keep-alive message. On receiving this message, the lease counter is reset to the original value. If the counter reaches zero and no keep-alive message is received, the base station reclaims that IP address.

Figure 2:
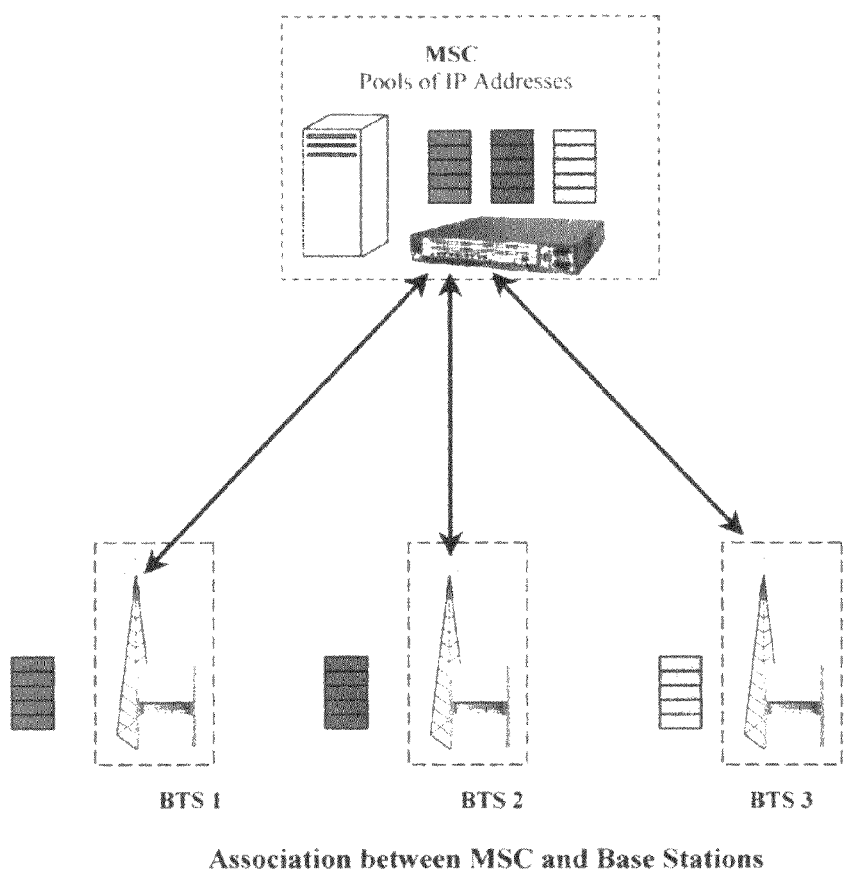
FIG. 2 is a diagram showing the association between MSC and base stations.

In the case of Intra-Dealer handoffs (handoffs between BTSs within the same MSC), the handset would not be required to obtain a new IP address as shown in FIG. 2. Since all BTSs operate within the domain of same MSC, they are assigned a distinct set of IP addresses. Thus, it would not be possible for two handsets to have the same IP address. A handset that is assigned an IP address at one BTS can move to all other BTSs within the same MSC domain without changing its IP address.

The MSC will maintain the master pool of IP addresses from which each base station is assigned a distinct subset. It also maintains the association between the base station and the range of IP addresses assigned to it. If a handset moves from one base station to another within the same MSC domain, it does not require a new IP address. However, the MSC must be informed of the change in association of that IP address, i.e. that IP address now belongs to the second base station. The new base station performs this task.

Once handoff completes, the base station informs the MSC that a new IP address has been added to its pool. The MSC then updates the association of that IP address. The old base station is provided with a new IP address by the MSC so that it can maintain a fixed number of IP addresses.

In the case of Inter-Dealer handoffs, if a handset decides that handoff has become necessary, it requests the new base station to assign an IP address. The decision to handoff is made on the basis of received signal strength. On receiving a request for IP address assignment, the prospective base station assigns an available IP address to the handset.

On receiving a new IP address, the handset relinquishes its old IP address by sending an explicit message to the old Base Station. If the connection to the old base station is lost by that time, the IP address is automatically released because the base station does not receive any keep-alive messages. The message that is used to request the IP address is extremely short and would not take more than one super-frame (30 ms), thereby reducing the delay in transmission. Also, since the base station assigns the IP address, only one hop needs to be traversed.

Figure 3:
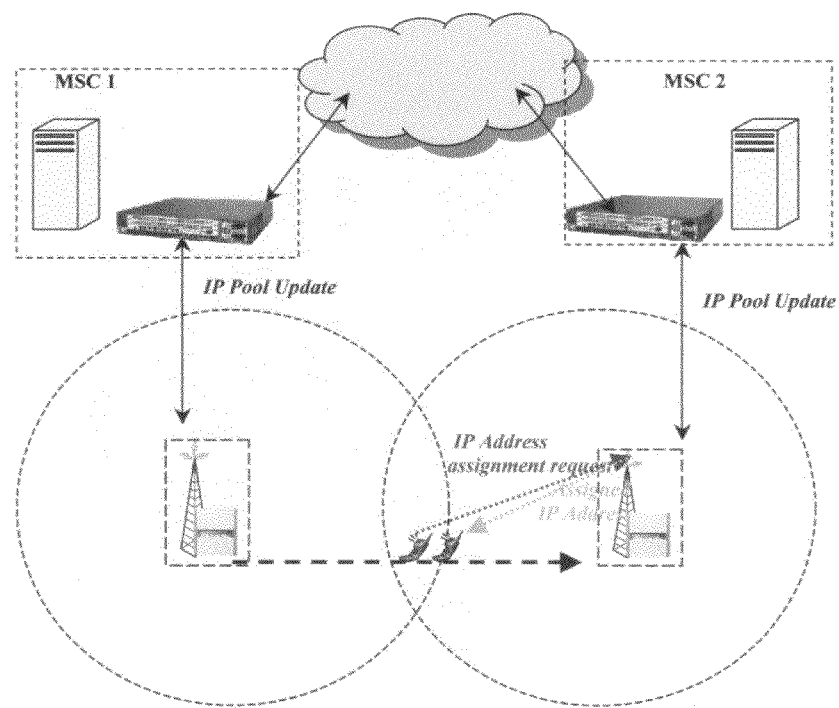
FIG. 3 is a diagram showing an IP address assignment procedure during a Handoff.

FIG. 3 depicts the scenario where a new IP address is requested during an Inter-Dealer handoff. Both the request and reply messages are proprietary and are much shorter in length than compared to DHCP messages. The request message is 16 bytes long, whereas the reply is 24 bytes long. Since the message size is smaller than the Link Layer MTU, no fragmentation is needed.

In summary, IP address allocation is a major contributor to latency observed during handoffs. The normal DHCP address allocation mechanism is not suitable for wireless links due to the large packet size and the corresponding higher link layer latency. In this application an optimized IP address allocation mechanism is disclosed that provides a substantial decrease in IP address allocation latency thereby reducing overall handoff latency.

What is claimed is:

1. A method for decreasing the latency in the mobile handset IP address assignment process by splitting the IP assignment function into two separate processes for mobile wireless networks having one or more mobile switching centers in electrical communication with one or more sub networks of one or more base stations servicing one or more mobile handsets using IP as a network layer protocol comprising:

first each of said one or more mobile switching centers having a pool of IP addresses and allocating a separate sub pool of IP addresses from said pool of IP addresses to each of said one or more base stations in each of said sub networks;

then each of said one or more base stations acquiring said allocated separate sub pool of IP addresses from each of said one or more mobile switching centers;

second said one or more mobile handsets beginning electrical communication with one of said one or more base stations;

then each of said one or more base stations assigning an IP address from the allocated and acquired separate sub pool of IP addresses held by each of said one or more base stations to each of said one or more mobile handsets such that as said one or more mobile handsets transfer electrical communication from a current base station to a new base station within said sub network said one or more mobile handsets continue to use the assigned IP address and said new base station sends a message to said mobile switching center that the IP address is now included in the new base station's allocated separate sub pool of IP addresses and said mobile switching center updating the allocated separate sub pool of IP addresses wherein each of said one or more base stations has an IP address timer and each of said one or more mobile handsets sends a periodic keep alive message to said one or more base stations such that when a base station assigns an IP address to a mobile handset said base station's IP address timer is set to a time that is counted down until said base station receives a keep alive message from said mobile handset indicating said mobile handset is still in use at which point the IP address timer resets and begins counting down again, or if no keep alive message is received by said base station the IP address timer counts to zero at which point the IP address is unassigned from said mobile handset and is available to be reassigned to a different mobile handset; and, then when said one or more mobile handsets transfer electrical communication from a current base station to a new base station outside said sub network said one or more mobile handsets sends a message requesting a new IP address assignment from said new base station, said new base station assigns a new IP address from said new base station's allocated and acquired separate sub pool of IP addresses, and said one or more mobile handsets sends a message to said current base station relinquishing the old IP address.

* * * * *